United States Patent
Stone

[11] Patent Number: 5,473,719
[45] Date of Patent: Dec. 5, 1995

[54] OPTICAL DISPERSION COMPENSATOR

[75] Inventor: Julian Stone, Rumson, N.J.

[73] Assignee: AT&T Corp., Murray Hill, N.J.

[21] Appl. No.: 308,247

[22] Filed: Sep. 19, 1994

Related U.S. Application Data

[63] Continuation-in-part of Ser. No. 152,655, Nov. 15, 1993, abandoned.

[51] Int. Cl.$^6$ .................................................. G02B 6/28
[52] U.S. Cl. ............................ 385/123; 385/24; 385/27; 359/124
[58] Field of Search ............................... 385/123, 24, 27, 385/28, 31, 33, 37, 45, 46, 47, 124, 126, 127, 130; 359/110, 124, 127, 173; 356/324, 361

[56] References Cited

U.S. PATENT DOCUMENTS

| | | | |
|---|---|---|---|
| 4,139,259 | 2/1979 | Kersten et al. | 385/46 |
| 4,515,428 | 5/1985 | Findakly | 385/46 |
| 4,726,644 | 2/1988 | Mathis | 385/46 X |
| 4,750,802 | 6/1988 | Bhagavatula | 385/33 |
| 4,768,853 | 9/1988 | Bhagavatula | 385/24 |
| 4,777,663 | 10/1988 | Charlton | 356/324 |
| 4,953,947 | 9/1990 | Bhagavatula | 385/31 |
| 5,224,183 | 6/1993 | Dugan | 385/27 |
| 5,339,157 | 8/1994 | Glance et al. | 385/37 |
| 5,361,319 | 11/1994 | Antos et al. | 385/123 |

OTHER PUBLICATIONS

"Monolithic InP/InGaAsP/InP grating spectrometer for the 1.48–1.56 m wvaelength range" by J. B. D. Soole, Appl. Phys. Lett. 58 (18) 6 May 1991.

"An NxN Optical Multiplexer Using a Planar Arrangement of Two Star Couplers" by C. Dragone, IEEE Photonics Technology Letters, vol. 3, No. 9, Sep. 1991, pp. 812–815.

"Principles of Optics" by M. Born & E. Wolf, published by The Macmillan Press, New York, 1959, pp. 411–413. No Month.

Primary Examiner—John D. Lee
Assistant Examiner—Phan T. H. Palmer

[57] ABSTRACT

Pulse broadening in a single mode optical transmission system due to wavelength dispersion is reduced by separating the different wavelength components and selectively delaying them. Upon recombination, the original phases of the wavelength components are restored, and the pulses narrowed. By using exclusively single mode devices, essentially lossless operation is realized.

6 Claims, 3 Drawing Sheets

OPTICAL DISPERSION COMPENSATOR

This application is a continuation-in-part of my earlier filed application Ser. No. 08/152,655, filed Nov. 15, 1993 now abandoment on Jan. 6, 1995.

TECHNICAL FIELD

This invention relates to optical transmission systems and, in particular, to arrangements for reducing the effect of group-velocity dispersion in single mode optical fibers.

BACKGROUND OF THE INVENTION

When optical waves of different wavelengths propagate along an optical fiber, they do so at different group velocities. This so-called chromatic, or group-velocity dispersion causes pulse broadening which limits the rate at which information can be carried through an optical fiber. Recently, there has been interest in dispersion compensators that use dual-mode fibers operated in the $LP_{11}$ spatial mode, close to their cutoff wavelength. Because higher-order spatial modes in optical fibers exhibit large, negative chromatic dispersion, such an arrangement provides a means for compensating for the positive dispersion in conventional single-mode fiber spans. See, for example, U.S. Pat. No. 5,185,827, issued Feb. 9, 1993, and assigned to applicant's assignee.

The attractiveness of using a dual-mode fiber for dispersion compensation stems from the ability to achieve large negative waveguide dispersion by operating close to the cutoff wavelength of the $LP_{11}$ mode, thereby minimizing the amount of fiber required to compensate a given amount of positive dispersion. While the use of less fiber reduces losses, as noted in the application of Craig D. Poole (Case 5), Ser. No. 08/150,513, filed Nov. 9, 1993, now U.S. Pat. No. 5,371,815 and assigned to applicant's assignee, operation close to cutoff greatly increases sensitivity to bending losses, and it is these losses that place a practical limit on how much dispersion compensation can be realized.

An alternative approach to this problem is the use of dispersion shifted fibers, as described in the article by V. A. Bhagavatula et at., entitled "Segmented Core Single-Mode Fibers with Low Loss and Low Dispersion," published in *Electron Lett*, 19, 317 (1983). However, such fibers are complicated structures and tend to be more lossy than one would like.

In U.S. Pat. No. 4,953,947, issued Sep. 4, 1990, a dispersion transformer is disclosed which employs a multimode delay optical waveguide to compensate for the dispersion produced in a transmission optical fiber. The multimode delay optical waveguide initiates the propagation of a plurality of modes which propagate therethrough at various velocities. The latter are selected to compensate for the dispersion introduced in the transmission fiber.

In U.S. Pat. No. 4,777,663, issued Oct. 11, 1988, a dispersion transformer is introduced into an optical system for the purpose of adding to the dispersion otherwise produced in an optical transmission system. The purpose in doing so is to limit the data rate of the system.

Both of the above-described systems employ multimode optical devices and fibers and, as such, are totally impractical as dispersion compensators. Any fiber-based device that is used to correct chromatic dispersion in a single-mode fiber must itself be single mode, where the term "single mode" is used in its accepted sense to mean that for a given wavelength, the fiber or device is supportive of only one propagating mode. This is so inasmuch as both the magnitude and functional form of chromatic dispersion in single mode fibers is different than that of any multimode device. In particular, the magnitude of modal dispersion is far greater than the chromatic dispersion in single mode fibers. In addition, the functional form of the dispersion depends upon the multimode device. In general, the functional form cannot be made the same as for a single mode fiber. Inasmuch as dispersion compensation must be made over a finite spectral width, this would preclude full dispersion compensation. A further, significant difficulty in using multimode devices for dispersion compensation in a single mode transmission system is that they would introduce excessive coupling losses. While light can be coupled from a single mode device to a multimode device without loss, the opposite is not true since coupling light into a single mode device requires that the input mode be matched to that of the single mode device. All the modes that are not matched are lost, resulting in large coupling losses.

It is, accordingly, an object of the present invention to effect low loss dispersion compensation in single mode transmission systems without the use of long lengths of optical fibers or specially designed fibers.

SUMMARY OF THE INVENTION

When an optical pulse propagates along an optical fiber, the different wavelength components making up the pulse propagate with different group velocities. This results in a change in the relative phases of these components and the resulting broadening of the pulse. In accordance with the present invention, these phases are restored and the pulse narrowed by separating the different wavelength components and selectively delaying them.

It is a feature of the present invention that all the components needed to produce wavelength separation, delay and recombination are achieved by using single mode components. As a result, such devices can be substantially lossless. It is a further feature of the invention that the entire dispersion compensator can be fabricated using integrated optical techniques.

These and other objects and advantages, the nature of the present invention, and its various features will appear more fully upon consideration of the various illustrative embodiments now to be described in detail in connection with the accompanying drawings.

DETAILED DESCRIPTION

Figure 1:
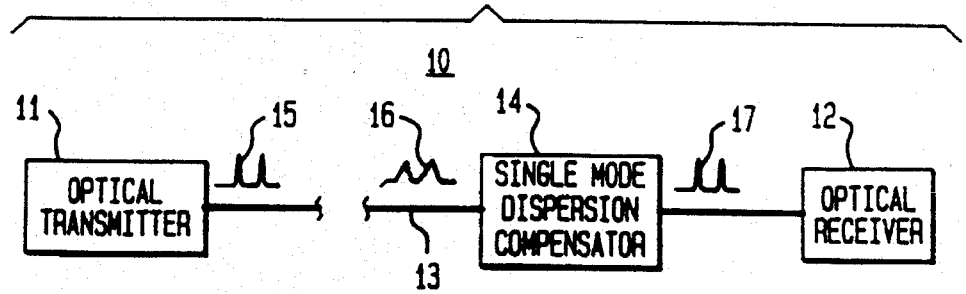
FIG. 1 shows an illustrative single mode optical fiber communication system to which the invention relates.

Referring to the drawings, FIG. 1 shows an illustrative optical fiber communication system 10 to which the invention relates. Typically, such a system includes an optical transmitter 11 whose output comprises a series of optical pulses 15, an optical receiver 12, and an interconnecting single mode optical fiber link 13. However, because the velocity with which optical wave energy propagates along a fiber varies as a function of wavelength, all optical fibers, both single-mode and multi-mode, introduce dispersion, which results in a broadening of the optical pulses as they propagate along the fiber. Because this broadening reduces the information carrying capacity of the system, various techniques for reducing the effects of wavelength dispersion have been proposed. Accordingly, a dispersion compensator 14 is typically included at the output end of the fiber link 13 where the broadened pulses 16 are restored to their original shape 17. In effect, the dispersion compensator introduces a negative dispersion, expressed in the common units of picoseconds per nanometer per kilometer, that compensates for the dispersion produced in the fiber link.

Figure 2:
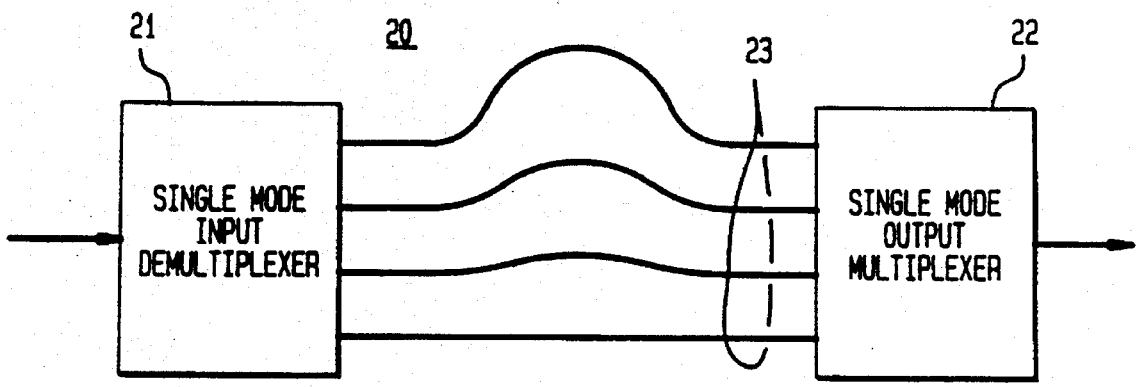
FIG. 2 shows, in block diagram, a single mode dispersion compensator in accordance with the teachings of the present invention.

FIG. 2, now to be considered, shows, in block diagram, a dispersion compensator 20 in accordance with the teachings of the present invention. In general, the compensator comprises a single mode input demultiplexer 21 and a single mode output multiplexer 22 connected by means of a plurality of differential single mode delay lines 23.

In general, chromatic dispersion includes a number of components. In a single mode fiber, one of the components is a function of the material of which the fiber is made. A second component, waveguide dispersion, is a function of the fiber configuration. In a multimode fiber, there is an added, modal dispersion component which is a function of the mode configuration.

Generally, the magnitude of the modal dispersion produced in a multimode device is far greater than the dispersion produced in a single mode device. In addition, the functional form of the dispersion is different than the dispersion of a single mode device. And finally, coupling between multimode devices is extremely inefficient. Accordingly, in accordance with the present invention, the input demultiplexer 21, the output multiplexer 22, and the differential delay lines 23 are all single mode devices.

Figure 3:
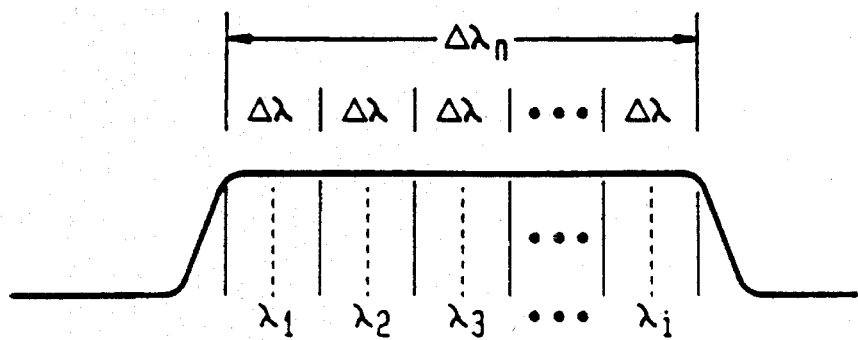
FIG. 3 shows the wavelength distribution of a typical optical pulse.
Figure 4:
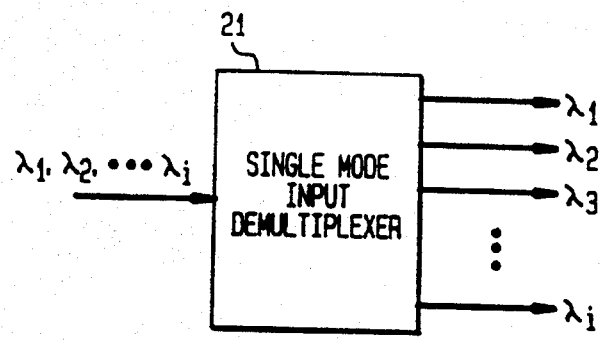
FIG. 4 shows the wavelength distribution of the input and output signals associated with the input single mode demultiplexer.

The operation of the compensator is based upon the recognition that the optical pulses have a wavelength distribution $\Delta\lambda_n$ that can be divided into a plurality of sub-bands of width $\Delta\lambda$, centered about wavelengths $\lambda_1, \lambda_2 \ldots \lambda_i$, as illustrated in FIG. 3. Because the propagation velocities of the different wavelength components are different, the phase relationships among the various components are disturbed, resulting in the undesired pulse broadening. In order to restore the correct phase relationships among the wavelengths components, in accordance with the invention, the components are separated by the demultiplexer and compensatory delays introduced. Thus, the first step in the compensation process is to separate the several different wavelength components. This is illustrated in FIG. 4, which shows the input demultiplexer 21 to which all of the wavelength components $\lambda_1, \lambda_2 \ldots \lambda_i$ are applied, and whose output comprises the separated, individual wavelength components.

Figure 5:
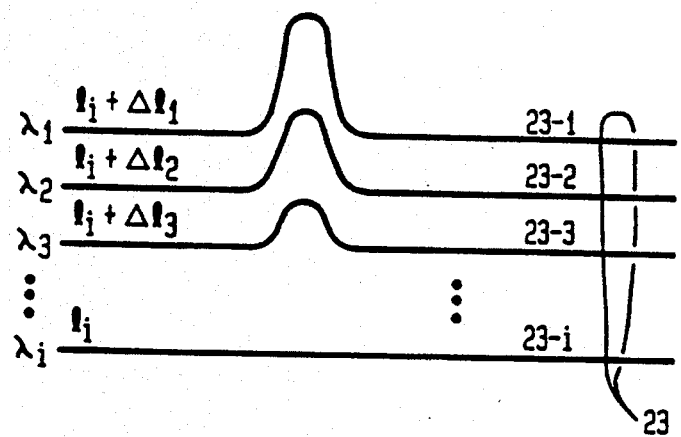
FIG. 5 shows the differential single mode delay lines and the delays associated with the different wavelength signal components.

Because the shorter wavelength components tend to propagate at higher velocities than the longer wavelength components, compensation requires that they be delayed more than the longer wavelength components. Accordingly, the delays in the differential delay lines are adjusted as a function of the component wavelength. For example, in FIG. 5 the length $l_i$ of the delay line 23-i for the longest wavelength signal $\lambda_i$ is less than that of all the other delay lines inasmuch as it propagates at the slowest velocity. The length of the delay line for the shortest wavelength signal $\lambda_1$ is the longest, being equal to $l_i$ plus some differential length $\Delta l_1$. For all the intermediate wavelength signals, $\lambda_2, \lambda_3, \ldots$, the lengths of the delay lines 23-2, 23-3 . . . are $l_i+\Delta l_2$, $l_i+\Delta l_3$ . . . respectively, where $\Delta l_1 > \Delta l_2 22 \Delta l_3 \ldots$.

Having re-established the proper phase relationships among the several wavelengths, the compensated signals are recombined in the output multiplexer 21.

As an example, let us consider a transmission fiber of length L over which a signal of bandwidth B is being transmitted. For a single mode fiber dispersion g ps/nm/km, the total time spread $\Delta T$ of the received signal due to dispersion is given by $$\Delta T = BgL. \tag{1}$$

For
$g=15$ ps/nm/km,
$B=10$ Ghz$\cong 0.07$ nm
and
$L=100$ km,
$\Delta T=100$ ps.

The increased length $l$ of the resulting pulse traveling through the fiber is $$l = c/n\Delta T \tag{2}$$

where c is the velocity of light and n the refractive index of the fiber. In the instant case, for $n=1.5$,
$l=2$ cm.

To compensate for this, the length difference $\Delta l_1$ between the longest delay line 23-1 and the shortest delay line 23-i is, accordingly, 2 cm. The differential lengths for the intermediate lines would be scaled in proportion to the wavelength of the several signal components.

Figure 6:
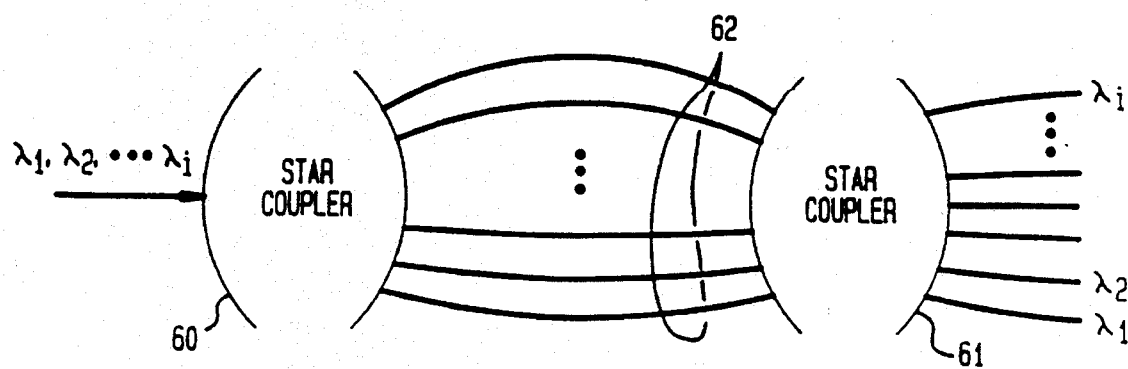
FIG. 6 shows a single mode multiplexer/demultiplexer comprising two star couplers connected by means of a plurality of single mode differential delay lines.

FIG. 6 illustrates a single mode multiplexer/demultiplexer that can be used to implement the invention. The device is of the type described by C. Dragone in a paper entitled "An N×N Optical Multiplexer Using a Planar Arrangement of Two Star Couplers," published September 1991 in IEEE Photonics Technology Letters, Vol. 3, No. 9. This arrangement includes a pair of single mode star couplers 60 and 61 connected by a grating 62, comprising an array of single mode delay lines. In operation, an input signal, including a plurality of wavelength components $\lambda_1, \lambda_2 \ldots \lambda_i$, is applied to star coupler 60. At the output of star coupler 61 the different wavelength components are separated and leave the coupler along its separate path for application to the differential delay lines 23 of the compensator.

Figure 7:
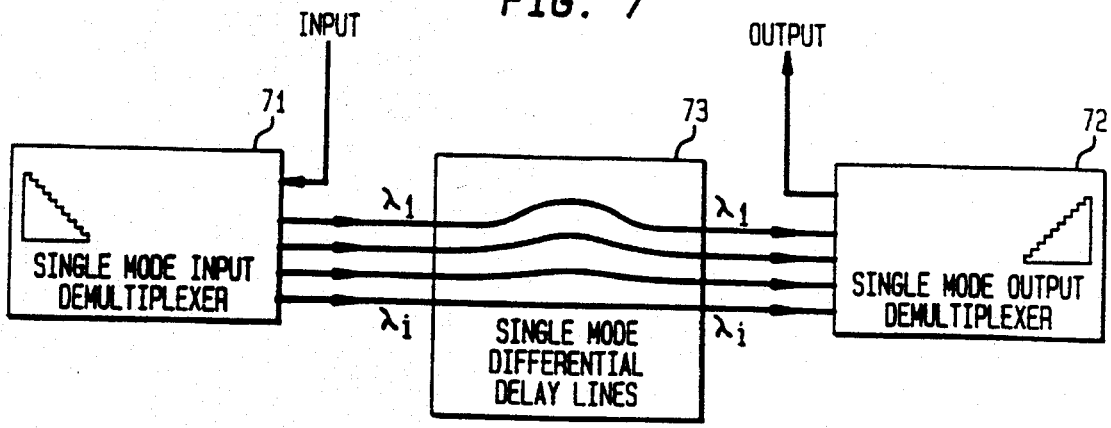
FIG. 7 shows a single mode dispersion compensator, in accordance with the invention, using single mode multiplexer/demultiplexers employing single mode reflective focusing diffraction gratings.

FIG. 7 shows an alternate embodiment of a dispersion compensator in accordance with the invention using multiplexer/demultiplexers employing a reflective focusing diffraction grating of the type described by M. Born and E. Wolf in their book "Principles of Optics" published in 1959 by The Macmillan Company of New York. Also see the article entitled "Monolithic InP/InGaAs/InP grating spectrometer for the 1.48–1.56 μm wavelength range" published by J. B. D. Soole et al. in the 6 May 1991 issue of Applied Physics Letters, Vol. 58, pp. 1949–1951.

It is an advantage of the above-described devices that they are essentially lossless and can be interconnected without loss. Accordingly, the use of such single mode devices to serve as the input demultiplexer and output multiplexer in a dispersion compensator in accordance with the present invention is without penalty.

Figure 8:
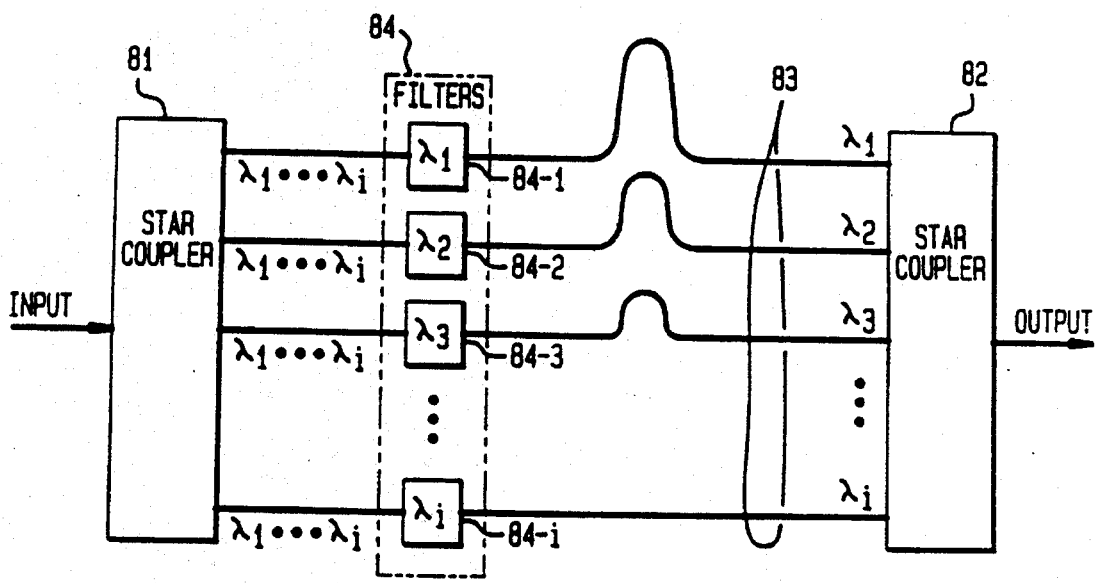
FIG. 8 shows a single mode dispersion compensator using bandpass filters to achieve wavelength separation.

In the embodiment of a dispersion compensator illustrated in FIG. 8, wavelength separation is achieved by the use of bandpass filters. In this embodiment the dispersion compensator comprises an input star coupler 81 and an output star coupler 82, connected by means of the differential delay lines 83. Because all the wavelength components are present at the outputs of coupler 81, each of the delay lines includes a bandpass filter 84-1, 84-2, . . . 84-i, tuned to pass one of the wavelength components. As explained herein above, each delay line is adjusted to provide the delay appropriate to the wavelength passed by the filter in that line. While simpler to construct, the losses in such a device would be substantially higher than the losses using the multiplexer/demultiplexers illustrated in FIGS. 6 and 7.

In the discussion thus far, dispersion compensation of only one input signal has been considered. However, optical transmission systems usually carry a plurality of multiplexed channels. In such cases, the invention can be employed to simultaneously compensate all the channels by designing the compensator such that it has a free spectral range equal to the channel spacing, or a multiple thereof.

What is claimed is:

1. A dispersion compensator comprising:

a single mode input demultiplexer;

a single mode output multiplexer;

and a plurality of different single mode delay lines connecting the output ports of said demultiplexer to the input ports of said multiplexer.

2. A dispersion compensator comprising:

single mode input means for separating an input signal into its wavelength components;

separate means for selectively delaying each of said wavelength components different lengths of time;

and single mode output means for recombining said delayed components in a common wavepath.

3. The compensator according to claim 2 wherein shorter wavelength components are delayed longer than longer wavelength components.

4. The compensator according to claim 2 wherein said input means includes:

a star coupler having an input port and a plurality of output ports connected to an equal plurality of wavelength filters; and wherein:

said output means comprises a star coupler having a plurality of input ports coupled to said delay means;

and an output port coupled to said common wavepath.

5. The compensator according to claim 2 wherein:

said separate means are single mode optical fibers of different lengths.

6. A dispersion compensator comprising:

an input star coupler having an input port and a plurality of output ports, and an output star coupler having a plurality of input ports and an output port;

and a plurality of wavepaths connecting each output port of said input star coupler to an input port of said output star coupler;

each wavepath including a wavelength filter tuned to a different bandpass and a section of delay line having a delay different from the delays associated with the other of said wavepaths.

* * * * *